United States Patent [19]

Lepetit

[11] Patent Number: 4,647,439

[45] Date of Patent: Mar. 3, 1987

[54] PROCESS FOR THE CONTINUOUS PRODUCTION OF ALUMINA FROM BAUXITES CONTAINING MONOHYDRATES USING THE BAYER PROCESS

[75] Inventor: Jean Lepetit, Aix-en-Provence, France

[73] Assignee: Aluminium Pechiney, Paris, France

[21] Appl. No.: 864,402

[22] Filed: May 19, 1986

[30] Foreign Application Priority Data

May 29, 1985 [FR] France .................... 8508575

[51] Int. Cl.$^4$ .............................................. C01F 7/06
[52] U.S. Cl. .................... 423/121; 423/123; 423/131
[58] Field of Search .............. 423/119, 121, 123, 131

[56] References Cited

U.S. PATENT DOCUMENTS

| | | | |
|---|---|---|---|
| 3,401,009 | 9/1968 | Gittos | 423/121 |
| 3,413,087 | 11/1968 | Roberts | 423/131 |
| 3,997,650 | 12/1976 | Yamada et al. | 423/121 |
| 4,145,398 | 3/1979 | Plass | 423/121 |
| 4,218,618 | 12/1978 | Yamada et al. | 423/121 |
| 4,426,363 | 1/1984 | Yamada et al. | 423/121 |

FOREIGN PATENT DOCUMENTS

| | | | |
|---|---|---|---|
| 1667822 | 7/1973 | Fed. Rep. of Germany | 423/121 |
| 20040 | 11/1965 | Japan | 423/121 |
| 1186389 | 4/1970 | United Kingdom | 423/121 |

Primary Examiner—H. T. Carter

Attorney, Agent, or Firm—Dennison, Meserole, Pollack & Scheiner

[57] ABSTRACT

A process for the continuous production of alumina by means of the Bayer process by alkaline attack in reactors on bauxites which primarily consist of aluminum monohydrates and contain silica in a free state or combined in the form of aluminum silicate, the essential aim of which is to delay scaling of the reactors by deposits of sodium silico-aluminate on the reactor walls. The process comprises the following steps: (1) the bauxite is put into suspension by crushing in a sodic liquor (aqueous solution of caustic soda); (2) the suspension is raised to a temperature of from 90° to 108° C. and held at that temperature for a period of time sufficient to convert at least 75% of the aluminum silicate contained in the bauxite into insoluble sodium silico-aluminate; (3) The suspension is then subjected to steam heating by passing through a tube-type heat exchanger under pressure at a temperature which is at least equal to 160° C. and preferably is from 160° to 230° C., with a speed of rise in temperature of from 2° to 12° C./minute and with a speed of flow in the tubular reactor of from 0.4 to 7 meters per second; (4) by heat exchange with a heat exchange fluid in a tubular reactor, the suspension is raised to a temperature of from 200° to 300° C. and preferably from 230° to 290° C. and maintained at that temperature so as to solubilize at least 90% of the extractible alumina; and (5) the suspension is returned to atmospheric pressure by successive expansion operations, with recovery of the steam.

13 Claims, No Drawings

PROCESS FOR THE CONTINUOUS PRODUCTION OF ALUMINA FROM BAUXITES CONTAINING MONOHYDRATES USING THE BAYER PROCESS

SUBJECT OF THE INVENTION

The invention concerns a process for the continuous production of alumina by alkaline attack, using the Bayer process and in a tubular reactor, on bauxites primarily consisting of aluminum monohydrates and further containing silica in the form of aluminum silicates such as kaolin.

STATE OF THE ART

The Bayer process which is widely described in the specialist literature constitutes the essential procedure for producing alumina which is intended to be converted into aluminum by igneous electrolysis.

In accordance with that process, the bauxite ore is treated in a hot condition by means of an aqueous solution of sodium hydroxide at a suitable level of concentration, thus causing solubilization of the alumina and the formation of a supersaturated solution of sodium aluminate.

After separation of the solid phase constituting the residue of the ore which has not been attacked, i.e., red mud, the supersaturated sodium aluminate solution is seeded with aluminum trihydroxide particles in order to cause precipitation of aluminum trihydroxide. The sodium aluminate liquor with its reduced alumina content is recycled to the attack stage after having been concentrated and recharged with sodium hydroxide in order to re-establish the appropriate degree of concentration for the operation of attacking the ore.

It is well known to those skilled in the art that the conditions under which the treatment is carried out have to be adapted, in accordance with the degree of hydration and the mineralogical structure of the alumina on the one hand and the nature and the proportion of the impurities present in the bauxite on the other hand, in particular silica, and iron and titanium oxides.

Thus, bauxites containing monohydrates require an attack operation at relatively elevated temperture (higher than 200° C.) in order rapidly and quantitatively to solubilize the aluminum monohydrate that they contain in the form of boehmite, diaspore or possibly substituted goethite.

The attack operation is generally carried out by means of heat exchangers which permit the bauxite which is put into suspension in a caustic soda liquor to be raised to the attack temperature required, and turbulent reactors in which the bauxite suspension is held at that temperature for the period of time required for solubilization of the major part of the aluminum monohydrate that it contains.

The heat exchangers are generally agitated autoclaves which are provided with nests of tubes supplied with live steam or steam resulting from expansion of the bauxite suspension after the attack operation, or exchangers of single-tube or multi-tube type, formed by a tube or tubes in which the bauxite suspension flows, being disposed in an external tubular casing supplied with heat exchange fluid (live steam or expansion steam, molten salts, organic liquids or a suspension which is still hot after an attack operation). The turbulent reactors are generally either agitated autoclaves which may or may not be fitted with heating nests of tubes, or a tube of sufficient length to provide the required residence time, at the attack temperature, having regard to the speed of flow of the suspension in the tube.

The suspension after attack is cooled until reaching atmospheric pressure, either by successive expansion steps in expansion means which produce vapor intended to feed the heat exchangers, or by direct exchange relationship with the initial bauxite suspension to be heated, in exchangers of single-tube or multi-tube type.

PROBLEM SET BY THE PRIOR ART

Different important chemical reactions occur between the time at which the bauxite is brought into contact with the caustic soda liquor and the time at which it issues from the tubular reactor at the attack temperature.

Firstly, if the bauxite contains a certain proportion of aluminum trihydroxide (hydrargillite), it is solubilized in its entirety before the maximum attack temperature is reached (generally before the temperature reaches 160° C.).

Secondly, aluminum silicate, generally in the form of kaolin $Al_2O_3 \cdot 2SiO_2 \cdot 2H_2O$, is dissolved and then reprecipitated in the form of sodium silico-aluminate (kaolinite) at a temperature which is generally lower than 180° C.

The latter reaction is troublesome in regard to proper operation of the heat exchangers as precipitation of the sodium silico-aluminate occurs in particular on the internal heat exchange surfaces of the exchangers (on the bauxite suspension side), with the formation of scale deposits which are poor conductors of heat, thereby giving rise to a drop in efficiency of the exchangers.

When the scale deposits have reached a certain thickness, the thermal losses and the difficulties in regard to the flow of suspension become such that it is necessary to stop the installation and to remove the scale chemically (acid dissolution), mechanically (destruction by knocking it) or hydraulically (high-pressure jets).

STATE OF THE PRIOR ART

Various solutions have been proposed for limiting the scaling phenomenon.

German patent application DE-A-1592194 filed on 6th May 1967, equivalent to French FR-B-1546418, discloses that it is possible to limit the rate at which scale is formed in single-tube or multi-tube exchangers by circulating the bauxite suspension within the tube or tubes at high speed, preferably between 2 and 5 meters per second.

In the same fashion, Hungarian Pat. No. 457 filed on 14th Nov. 1960, equivalent to Great Britain Pat. No. 939619 and German DE No. 1202258, provides for a high speed of circulation of from 1.2 to 1.5 meters per second, and shows the improvement as regards the formation of scale in a desilicatation operation before the introduction of the bauxite suspension into the heat exchangers. The desilicatation operation consists of keeping the bauxite suspension in an agitated condition for a period from 6 to 8 hours, at a temperature of from 70° to 100° C. That patent also points to a similar improvement when the desilicatation operation is carried out at a temperature of more than 120° C. in a reactor which is not heated, but inserted into a series of autoclaves.

However, the applicants found that none of the above-indicated solutions was satisfactory, whether they were taken separately or in association.

The high speeds (>1 meter per second) through the arrays of autoclaves are very difficult to attain and, above 2 meters per second in single-tube or multi-tube exchangers, very high levels of pressure drop are incurred, in particular in high-capacity installations which are those that are most widely used as they are more economical in terms of capital investment and operating costs.

For example, for an installation for carrying out an attack operation at a temperature of 260° C., which makes it possible to produce 300,000 tonne of $Al_2O_3$ per annum, the pressure drop in regard to the bauxite suspension to be heated to a temperature of 260° C. goes from 10 to 70 bars when the speed of flow of the suspension goes from 2 to 5 meters per second, for the same heat exchange area.

Another example which is drawn from simultaneous industrial operation on the same quality of bauxite, using two attack installations of which one was provided with autoclaves heated by nests of tubes and the other was provided with single-tube reheaters showed that the speed of flow of the bauxite suspension is an important criterion in regard to ensuring a suitable hydraulic operating condition in the heat exchangers, but not in regard to the formation of scaling.

In fact, the period of time over which the attack operation using autoclaves could be satisfactorily carried out could reach 75 days between two descaling operations, whereas the attack operation using a single-tube exchanger could operate only for 24 days, although the speed of flow of the suspension (1.8 meters per second) was greater than the mean speed of flow through the nests of tube of the autoclaves, such speed being achieved by virtue of radial agitation by means of a blade-type agitator.

In carrying out the above-indicated comparative tests, applicant discovered that the important criterion in regard to scale formation was the speed of rise in temperature of the bauxite suspension in the exchangers.

The higher the speed of rise in temperature, the greater is the degree of scaling on the heating surfaces.

In the above-indicated comparative tests, the speeds of temperature rise were 1° C./minute for the autoclaves and 7° C./minute for the single-tube exchangers.

Moreover, speaking generally, the increase in the speed of flow of the suspension in the single-tube or multi-tube exchangers contributes to increasing the rate of temperature rise.

It is only with very high rates of flow, which result in substantial abrasion of the walls of the tube, that it is possible to prevent the formation or growth of scale deposits. That solution is not to be used in the case of highly abrasive bauxites such as diaspore bauxites from Greece or China.

As regards the desilicatation operation before attack at a temperature of from 70° to 100° C. in accordance with the claim of the Hungarian patent, the applicants found that the gain in regard to scaling permitted by that solution is very slight, or even zero insofar as the gain in regard to scaling is compensated by the following considerations:

on the one hand, the fact that it is necessary to heat the bauxite suspension in the desilicatation operation before it passes into the attack reheaters, which is a disadvantage in regard to thermal recovery in the heat exchangers by virtue of the reduction in the temperature difference between the hot and cold sources; and on the other hand, the thermal losses involved in the desilicatation operation.

Continuing with his investigation, the applicant has shown that the rate of conversion of aluminum silicate into sodium silico-aluminate under the conditions of the above-mentioned Hungarian patent is lower than 50% as is quoted in that patent, and that that rate of conversion is insufficient to guarantee a gain in regard to thermal recovery in the heat exchangers.

The above-quoted Hungarian patent also claims the possibility of carrying out the desilicatation operation at a temperature of higher than 120° C. in reactors which are disposed between the heat exchangers.

That solution was the subject of experiment on an industrial scale by the present applicant with different types of bauxite, giving a residence time of 30 minutes at a temperature of 130° to 135° C. in two autoclaves which were agitated but not heated. That solution made it possible to increase the period of operation of the single-tube only from 24 to 30 days.

The a posteriori explanation for the disappointing results indicated above was that on the one hand the residence time of 30 minutes was insufficient and on the other hand the temperature during the residence time was too high.

Optimizing the conditions of such a desilicatation operation in order to arrive at results equivalent to carrying out an attack operation in an autoclave (operation over a period of 75 days) would have involved investing in at least 5 residence time autoclaves, that is to say, almost as many as in an attack operation in which the heat exchangers are made up of autoclaves and nests of tubes (6 thereof are required to increase the temperature to 160° C.).

The gain in terms of capital investment, which is linked to the substitution of autoclave type exchangers for single-tube or multi-tube type exchangers would thus have been lost.

That solution is really only an attractive proposition in regard to attacking hydrargilite-type bauxites at a temperture of less than 170° C. Under those conditions, the capital investment cost of the autoclave which provides a temperature residence time is substantially lower by virtue of a lower operation pressure.

TECHNICAL PROBLEM TO BE SOLVED

After having thus analyzed and carefully experimented with the prior-art processes, applicant carried out research into the conditions under which single-tube or multi-tube exchangers which are less expensive in terms of capital investment than autoclaves fitted with nests of tubes could be operated without stoppages for descaling over periods of greater than at least one month.

SUBJECT OF THE INVENTION

The subject of the present invention is a process for treating bauxites primarily formed of aluminum monohydrates and also containing a certain amount of silica, in particular in the form of kaolin $Al_2O_3.2SiO_2.H_2O$, which process makes it possible very substantially to reduce the rate of scaling of the heat exchangers and the tubular reactors, said process comprising the following sequential stages or steps:

(a) Crushing the bauxite and putting it into suspension in an aqueous solution of sodium hydroxide (basic operation of the Bayer process) at a rate of about 1 tonne of bauxite (from 0.14 to 1.8 tonne) per cubic meter of sodium hydroxide solution at a concentration of about 150 to 300 grams of caustic $Na_2O$ per liter. Depending on its origin, that solution may also contain a certain proportion of solubilized alumina. In the sodium hydroxide solution, dissolution of the aluminum monohyrate cannot occur at low temperature;

(b) Desilicatation of the suspension at atmospheric pressure by maintaining it at a temperature of from 90° to 108° C. and for a sufficient period of time to convert at least 75% of the aluminum silicate contained in the bauxite into insoluble sodium silico-aluminate;

(bi) Optional addition of sodium hydroxide solution, at a concentration equal to or close to that used in the first stage, so as to have from 0.14 to 0.25 tonne of bauxite per $m^3$ of solution;

(c) Reheating the suspension with steam in a tubular heat exchanger, under pressure, to a temperature which is at least equal to 160° C. and which is preferably between 160 and 230° C., with a speed of rise in temperature of the bauxite suspension of between 2° and 12° C./minute, and preferably between 2° and 10° C./minute, and a speed of flow of the suspension of between 0.4 and 7 meters per second and preferably between 1 and 4 meters per second;

(d) Then, by exchange with a heat exchange fluid, the bauxite suspension is raised to a temperature of between 200° and 300° C. and preferably between 230° and 290° C., and maintained at that temperature for the period of time required to solubilize at least 90% of the extractible alumina, that is to say, the alumina which is not combined with the silica; and (e) Finally, and in accordance with the Bayer process, the suspension is cooled by successive expansion steps in order to return it to atmospheric pressure, such expansion steps producing steam which is intended for reheating the suspension that has not been attacked, in the single-tube or multi-tube exchangers.

The sodium hydroxide solution which is used in the first bauxite crushing and suspension stage may at least in part result from recycling of the liquors which are referred to as being "partially exhausted in respect of alumina" at the end of the Bayer cycle and which may still contain from 150 to 250 g/liter of caustic $Na_2O$ and from 80 to 160 grams/liter of solubilized alumina in the form of sodium aluminate.

Likewise, after the desilicatation step, the bauxite suspension is diluted by the addition of the same sodium hydroxide solution so as to have about 0.14 to 0.25 tonne of bauxite per $m^3$ of sodium hydroxide solution.

The desilicatation stage is particularly important in the process in accordance with this invention. The time required for converting the aluminum silicate into sodium silico-aluminate varies and depends in particular on the proportion of aluminum silicate in the bauxite and the amount of sodium hydroxide solution which is brought into the presence of the bauxite during the desilicatation operation. That period fo time is reduced in particular when the proportion of aluminum silicate in the bauxite increases or when the amount of solution per tonne of bauxite which is brought into the presence thereof falls.

In addition, applicant discovered that the above-indicated period of time was further reduced if the desilicatation operation was carried out in a succession of agitated tanks disposed in series rather than in a single agitated tank.

Scaling of single-tube or multi-tube reheaters, due to sodium silico-aluminate scale, up to a temperature of 170° C, decreases considerably when the rate of conversion of aluminum silicate into sodium silico-aluminate rises above 75%. Thus, the period of time for which the attack exchangers can operate properly between two descaling operations may be doubled when the above-mentioned conversion rate goes from 75% to 95%.

The speed of flow in the exchanger tubes must peferably be higher than 1 meter per second in order to prevent the deposit of large particles of bauxite at the bottom of the horizontally disposed tubes in which the bauxite suspension flows. Above a speed of 4 meters per second, and in particular 7 meters per second, the rate of abrasion of the exchanger tubes is no longer negligible.

The optimum speed depends on the capacity of the attack reactors. In fact, the greater the capacity of the attack reactors, the lower is the rate of temperature rise for the same number of tubes carrying the flowing suspension. In order not to have excessively high rates of temperature rise (not more than 10° C./minute), which encourage the formation of scale, it will not be an attractive proposition to have tubes of excessively small diameter (<80 mm) in a single-tube reactor with a fortiori in a multi-tube reactor. On the other hand, with tube of substantial diameter (>250 mm), it will be possible to operate with speeds of the order of 2 meters per second and higher. The residence time of the bauxite suspension at the attack temperature will be sufficient for more than 90% of the alumina in monohydrate or trihydrate form to be solubilized.

EMBODIMENTS OF THE INVENTION

EXAMPLE 1

This Example comprises attacking a bauxite containing monohydrate (boehmite) and also containing trihydrate (hydrargilite), of the following composition:

| Element: | % by weight |
| --- | --- |
| Firing loss | 25.8% |
| $Al_2O_3$ | 54.9 |
| $Fe_2O_3$ | 7.5 |
| $TiO_2$ | 2.9 |
| Total $SiO_2$ | 5.8 |
| $SiO_2$ as aluminum silicate | 3.0 |

The desilicatation operation was carried out over a period of 5 hours in 3 tanks in a series arrangement, which were agitated and maintained at a temperature of 100° C., in the presence of 1 tonne of finely crushed bauxite in suspension in 1 $m^3$ of aqueous sodium hydroxide solution containing 220 grams of caustic $Na_2O$ per liter of solution and 135 g of $Al_2O_3$ per liter of solution, thereby to convert 82% of the aluminum silicate into sodium silico-aluminate. The procedure then involved reheating the bauxite suspension issuing from the desilicatation operation, mixed with 6 $m^3$ of sodium hydroxide solution containing 220 g of $Na_2O$ per liter and 135 g of soluble $Al_2O_3$ per liter, in the form of sodium aluminate, in single-tube exchangers through which the suspension passes at a speed of 2 meters per second, and with a rise in temperature at 6° C./minute to a temperature of 175° C. The temperature was then raised to and held at 235° C. in order to put the aluminum monohydrate into solution. The solution was then cooled, after attack, by successive expansion operations, until reaching atmospheric temperature, with recovery of the expansion steam which is used for heating the suspension.

The average time between two succesive stoppages for the purposes of removing the sodium silico-aluminate scale deposits was 55 days.

EXAMPLE 2

This Example involved atacking a bauxite containing monohydrate ("diaspore" type) of the following composition:

| Element | % |
|---|---|
| Firing loss | 15.2 |
| $Al_2O_3$ | 68.0 |
| $Fe_2O_3$ | 1.3 |
| $TiO_2$ | 4.2 |
| Total $SiO_2$ | 11.4 |

The desilicatation operation was carried out over a period of 5 hours at 100° C. in 3 tanks in series, with agitation, using 1.8 tonne of bauxite in suspension in 8 $m^3$ of recycled aqueous sodium hydroxide solution containing 230 g of caustic $Na_2O$ and 140 g of soluble $Al_2O_3$ (in the form of Na aluminate) per liter of solution so as to convert 88% of the aluminum silicate into sodium silico-aluminate. The suspension after the desilicatation operation was then reheated to a temperature of 220° C. in single-tube reheaters, with the temperature being increased at a rate of 4° C. per minute and with the speed of the suspension being controlled at 2.0 meters per second.

The temperature was then raised to and held at 260° C. to effect dissolution of the aluminum monohydrate, then the suspension was cooled by successive expansion operations until reaching atmospheric pressure, with recovery of the expansion steam that was used for reheating the suspension.

A period of more than 60 days between two successive stoppages of the installation for the purposes of removing the sodium silico-aluminate scale deposits was found.

I claim:

1. A process for the continuous production of alumina using the Bayer process by alkaline attack in reactors on bauxites primarily comprising aluminum monohydrates and containing silica which is in a free state or combined in the form of aluminum silicate wherein, in order to retard scaling of the reactors by deposits of sodium silico-aluminate on the walls of the reactors, the following operations are successively carried out:
   (a) The bauxite is put into suspension by crushing in a sodic liquor comprising an aqueous solution of caustic soda;
   (b) The suspension of (a) is treated by being raised to a temperature of from about 90° to 108° C. and held at that temperature for a period of time sufficient to convert at least 75% of the aluminum silicate contained in the bauxite into insoluble sodium silico-aluminate;
   (c) The treated suspension of (b) is then subjected to steam heating by passing through a tube-type heat exchanger under pressure at a temperature which is at least equal to about 160° C., with a speed of rise in temperature of from 2° to 12° C./minute and with a speed of flow in the tubular reactor of from 0.4 to 7 meters per second;
   (d) By heat exchange with a heat exchange fluid in a tubular reactor, the suspension of (c) is raised to a temperature of from 200° to 300° C. and maintained at that temperature so as to solubilize at least 90% of the extractible alumina; and
   (e) The suspension of (d) is returned to atmospheric pressure by successive expansion operations, with recovery of the steam.

2. A process according to claim 1 wherein, in (c), the temperature in the heat exchanger is from about 160° to 230° C.

3. A process according to claim 1, wherein, in (d), the suspension is raised to a temperature from about 230° to 290° C.

4. A process according to claim 1 wherein, stage (a) comprises putting into suspension 0.14 to 1.8 tonne of bauxite per $m^3$ of an aqueous sodium hydroxide soltion containing from 150 to 300 grams per liter of caustic $Na_2O$.

5. A process according to claim 1 wherein, in stage (b), the residence time at the temperature of from 90° to 180° C. is from 2 to 10 hours so as to convert at least 85% of the aluminum silicate into insoluble sodium silico-aluminate.

6. A process according to claim 1 wherein, after stage (b), aqueous sodium hydroxide solution is added so as to have a ratio by mass of desilicated bauxite, in tonnes, per $m^3$ of aqueous sodium hydroxide solution of from 0.14 to 0.25.

7. A process according to claim 6 wherein the aqueous sodium hydroxide solution originates at least in part from recycling of the liquors which are partially exhausted in respect of soluble alumina at the end of a Bayer cycle and which may contain from 80 to 160 grams per liter of soluble alumina and from 150 to 250 grams per liter of caustic $Na_2O$.

8. A process according to claim 1 wherein the aqueous sodium hydroxide solution originates at least in part from recycling of the liquors which are partially exhausted in respect of soluble alumina at the end of a Bayer cycle and which may contain from 80 to 160 grams per liter of soluble alumina and from 150 to 250 grams per liter of caustic $Na_2O$.

9. A process according to claim 8 wherein, stage (d) is carried out at a temperature of higher than 230° C. if the bauxite is a boehmite-based bauxite and at a temperature of higher than 255° C. if the bauxite is a diaspore-based bauxite.

10. A process according to claim 1 wherein, in stage (c), the speed of rise in temperature is from 3° to 8° C./minute.

11. A process according to claim 1 wherein, in stage (c), the speed of flow in the tubular reactor is from 1 to 4 meters per second.

12. A process according to claim 1 wherein, stage (d) is carried out in a single-tube reactor.

13. A process according to claim 1 wherein, stage (d) is carried out in a reactor formed by a multi-tube nest.

* * * * *